United States Patent [19]

Murphy et al.

[11] Patent Number: 5,058,034
[45] Date of Patent: Oct. 15, 1991

[54] DIGITAL NEURAL NETWORK WITH DISCRETE POINT RULE SPACE

[75] Inventors: John H. Murphy; Terry A. Jeeves, both of Penn Hills Township, Allegheny County, Pa.

[73] Assignee: Westinghouse Electric Corp., Pittsburgh, Pa.

[21] Appl. No.: 416,563

[22] Filed: Oct. 3, 1989

Related U.S. Application Data

[63] Continuation-in-part of Ser. No. 364,475, Jun. 12, 1989.

[51] Int. Cl.$^5$ ............................................. G06F 15/18
[52] U.S. Cl. .................................................. 364/513
[58] Field of Search ........................................ 364/513

[56] References Cited

PUBLICATIONS

Implementing Neural Nets with Programmable Logic; J. J. Vidal; IEEE Transactions on Acoustics, Speech, and Signal Processing; vol. 36, No. 7, Jul. 1987; pp. 1180–1190.

Richard O. Duda, Peter E. Hart and Nils J. Nilsson, "Subjective Bayesian methods for rule-based inference systems", pp. 192–199.

Primary Examiner—Allen R. MacDonald
Attorney, Agent, or Firm—W. G. Sutcliff

[57] ABSTRACT

This application discloses a system that optimizes a neural network by generating all of the discrete weights for a given neural node by creating a normalized weight vector for each possible weight combination. The normalized vectors for each node define the weight space for that node. This complete set of weight vectors for each node is searched using a direct search method during the learning phase to optimize the network. The search evaluates a node cost function to determine a base point from which a pattern more within the weight space is made. Around the pattern mode point exploratory moves are made which are cost function evaluated. The pattern move is performed by eliminating from the search vectors with lower commonality.

2 Claims, 5 Drawing Sheets

DIGITAL NEURAL NETWORK WITH DISCRETE POINT RULE SPACE

CROSS REFERENCE TO RELATED APPLCIATIONS

This application is a Continuation-in-Part of U.S. Application No. 07/364,475 filed Jun. 12, 1989 by Murphy, Jeeves and Anderson entitled Probabilistic Reasoning System and incorporated by reference herein. This application is also related to U.S. Application entitled Probabilistic Reasoning System With Enhanced Capabilities And Improved Precision Ser. No. 07/416622 by Murphy, Jeeves and McLain and U.S. Application entitled Neural Networks And Adaptive Reasoning Systems by Murphy and Jeeves Ser. No. 416626, both of which are incorporated by reference herein.

BACKGROUND OF THE INVENTION

1. Field of the Invention

The present invention is directed to a neural network optimization method suitable for traditional perceptron neural nodes as well as probability based or product operation based nodes as discussed in the related application and, more particularly, is directed to an optimization method which specifies how to determine the search space for the weights of the nodes and specifies how to search for the optimum weights within that search space.

2. Description of the Related Art

Many people have investigated the perceptron processing element because it has the essential features needed to build an adaptive reasoning system, i.e. a neural network. The problem which has plagued the neural network field throughout the last 30 years is that most attempts to instill a learning process into a neural network architecture have been successful only to a degree. The neural network learning algorithms are generally very slow in arriving at a solution. Most neural network learning algorithms have their roots in mathematical optimization and, more specifically, the steepest descent optimization procedure. As a result, the approaches utilized by the neural network community have been neither clever nor fast. What is needed is a different approach to neural network learning that does not involve significant amounts of mathematical operations to arrive at an optimal solution. This approach to learning must take advantage of the structure of the neural network optimization problem in order to achieve significant gains in computational speed.

SUMMARY OF THE INVENTION

It is an object of the present invention to provide a method which determines the search space for weights of neural network nodes.

It is also an object of the present invention to provide a method of determining the optimal weights within that search space.

The above objects can be accomplished by system that generates all of the weights for a given neural node by creating a normalized weight vector for each possible weight combination. This complete set of weight vectors for each node is searched using a direct search method during the learning phase to thereby optimize the network.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
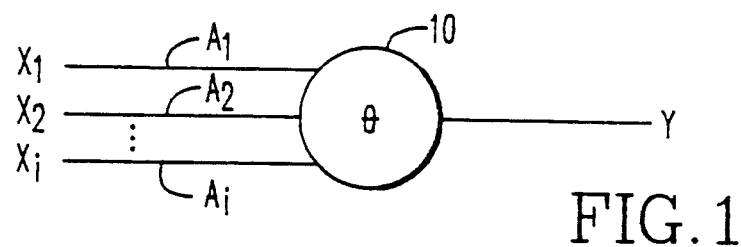
FIG. 1 illustrates a neural network node.

A neural network element is generally a device with a number of input signals $x_i$ and an output signal $y$ as illustrated in FIG. 1. The input and output signals may be either discrete or continuous. In the traditional neural network logic element called a perceptron or threshold logic element, the inputs are combined by multiplying them by weights $A_i$ and summing as set forth in equation 1

$$\sum_{i=1}^{n} A_i x_i \geq \Theta = y \tag{1}$$

An output signal (TRUE) is produced if the sum exceeds some threshold value $\Theta$ otherwise there is no output (FALSE). Variants on this device produce an output which is some other, less abrupt, function of the sum, for example, a sigmoid (or logistic function) or a truncated linear function. In the discrete case, the signals may be taken to be either $+1$ or $-1$. In general, the input weights may be positive or negative Other forms of neural network elements, as discussed in the related and parent applications perform the operations illustrated in equations 2-5.

$$\prod_{i=1}^{n} (A_i x_i + B_i) = y \tag{2}$$

$$\prod_{i=1}^{n} \left( \sum_{j=1}^{m} A_j x_j \right) = y \tag{3}$$

$$\prod_{i=1}^{n} (A_i x_i + B_i) \geq \Theta = y \quad (4)$$

$$\prod_{i=1}^{n} \sum_{j=1}^{m} A_{ij} x_i^j \geq \Theta = y \quad (5)$$

where the transformation constants A and B are the weights. The threshold logic element versions of neural node as represented by equations 1, 4 and 5 have all of the capability of the key Boolean logic functions, AND, OR and NOT. Consequently, any arbitrary logical expression can be rewritten solely in terms of threshold logic elements. To see this more explicitly, consider the dyadic (2 input) AND function which has an output only when both of its inputs are active. In a two-input threshold logic element, this condition is achieved by setting the threshold sufficiently high that a single input will not activate the element but two inputs will. On the other hand, the dyadic OR function has an output when either of its inputs are active. In a two-input threshold logic element, this condition is achieved by setting the thresholds sufficiently low that a single input will activate the element. The NOT function is achieved by using negative weights on the input where true and false are represented by +1 and −1. In this manner, we can form threshold logic element equivalents for the key Boolean logic functions. The threshold logic element earns a place, along side of NOR and NAND, as a single device capable of expressing any arbitrary logic function. When the product transformation versions of the neural node, represented by equations 2-5, is used, the logic element will generate both linearly separable and non-linearly separable Boolean logic functions and when equations 3 or 5 are used a universal or general purpose element is produced. The versions of the neural node represented by equations 2-5 can also be used to perform set theoretic operations which include probability based adaptive reasoning systems.

Traditional neural networks optimize the interconnection weights so that the resulting outputs agree with desired outputs of the training. The weight space over which this optimization is performed is continuous therefore a great deal of time is spent in changing these weights with absolutely no regard to whether or not such changes should produce changes in the output. We have determined that neural networks and expert system networks are isomorphic. The unique mapping between the neural network weight space and the expert system rule space indicates that the neural network weight space is highly structured and is divided into a finite number of discrete regions. In each region of the weight space, one of four types of expert system rules apply. Some regions represent mere implication rules (e g. A→H), other regions represent conjunctive (AND) rules (e.g AB→H), other regions represent disjunctive (OR) rules (A+B→H), and still other regions represent a disjunction of conjunctive rules (e.g. AB+CD→H). This mapping will be explained with respect to monadic (one input) neural nodes and dyadic (two input) nodes. The same analysis can be performed for triadic (three input) and higher ordered nodes.

Figure 2:
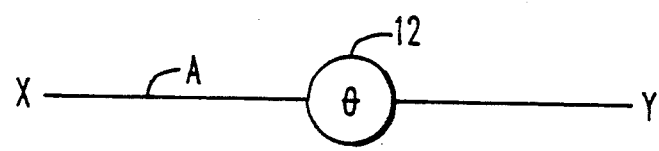
FIG. 2 depicts a monadic (single input) neural network node.

The behavior of a threshold logic element with only one input depends on the relative values of the input weight A and its threshold value $\Theta$. As the ratio of these values changes, the threshold logic element will carry out different Boolean logic functions. This monadic threshold logic element is illustrated in FIG. 2. To determine the output value y using this element, we compare its weighted input, $S=Ax$, with its threshold value, $\Theta$. There will be an output (TRUE) whenever S exceeds $\Theta$, otherwise, their will be no output (FALSE). If A is TRUE (has value +1), there is an output whenever A is greater than $\Theta$; and if A is FALSE (has value −1), there is an output whenever A is less than $-\Theta$. This defines two regions for the parameter A which will overlap or not depending on whether the threshold value $\Theta$ is positive or negative. The two regions thus define a third region which consists of either the region between the two or their overlap, depending on whether $\Theta$ is positive or negative. The boundaries of the resulting three regions is set by the two values $-|\Theta|$ and $|\Theta|$. Combining the above information, we have:

For x greater than $|\Theta|$, the output will be TRUE or FALSE as A is TRUE or FALSE, respectively
that is, the output will be A.

For x less then $-|\Theta|$, the output will be TRUE or FALSE as A is FALSE or TRUE, respectively
that is, the output will be NOT A.

For x between $-\Theta$ and $\Theta$, the output will depend on the sign of $\Theta$:
if $\Theta$ is positive, the output is FALSE
if $\Theta$ is negative, the output is TRUE.

Figure 3:
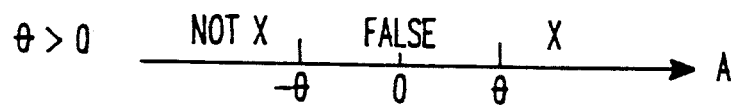
FIG. 3 illustrates the mapping between a weight space in the monadic neural node and an expert rule space.
Figure 3:
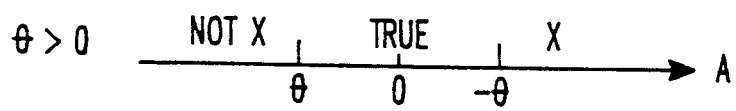

These are the four possible output functions (A, NOT A, TRUE, FALSE) for a one input threshold logic element with input A. FIG. 3 illustrates the two maps of the input parameter space showing which values of A emulates these four output functions.

The analysis for threshold logic elements with two inputs will follow the same approach used above. First we divide the continuous weight space into discrete regions. We then look for relations between the input weights, $A_i$, and the threshold value $\Theta$. These relations will be lines (planes, hyperplanes) in $A_i$ whose coefficients are a set of values of the inputs, $(x_i)$. This collection of lines (planes, hyperplanes) divides the input parameter space (hyperspace) of $A_i$ into regions $R_j$. Within any one such region, the threshold logic element corresponds to a specific Boolean logic function. We will next determine all of the sets of inputs, $(x_i)$, for which, in this region, the output value is TRUE. This collection of sets defines the Boolean function to which, in this region, the threshold logic element corresponds. As above, to determine the output value of the threshold logic element, we will compare the sum of the weighted inputs, $S=\Sigma A_i x_i$, with the threshold, $\Theta$. Again, there is an output (TRUE) whenever S exceeds $\Theta$, otherwise, there is no output (FALSE).

Figure 4:
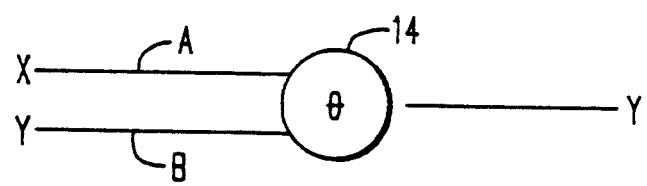
FIG. 4 depicts a dyadic (two input) neural node.

The behavior of a threshold logic element with two inputs, x and y, depends on the relationship between the values of its input weights, A and B, and the value of its threshold, $\Theta$. As these values change, the threshold logic element will carry out different linearly separable Boolean logic functions. This dyadic threshold logic element is illustrated in FIG. 4.

To determine the output value, we compare the element's weighted input, $S=Ax+By$, with its threshold value, $\Theta$. There will be an output (TRUE) whenever S exceeds $\Theta$, otherwise, there will be no output (FALSE). We have four sets of input values, listed in Table 1, yielding four expressions for S.

TABLE 1
LINEAR SEPARATING FUNCTIONS FOR THE DYADIC THRESHOLD LOGIC ELEMENT

| INPUTS | | WEIGHTED INPUT | SEPARATING LINES |
|---|---|---|---|
| x | y | SUM S | NAME |
| −1 | −1 | −x − y | α |
| +1 | −1 | +x − y | β |
| −1 | +1 | −x + y | β' |
| +1 | +1 | +x + y | α' |

Setting each of the expressions for S equal to Θ, we obtain two sets of parallel lines α, α' and β, β'. Each pair of parallel lines divides the plane into three regions. For the pair α, α', the regions are:

$$x + y < -|\Theta| \quad -|\Theta| < x + y < |\Theta| \quad |\Theta| < x + y$$

Similarly, for the pair β, β', the regions are:

$$x - y < -|\Theta| \quad -|\Theta| < x - y < |\Theta| \quad |\Theta| < x - y$$

Figure 5:
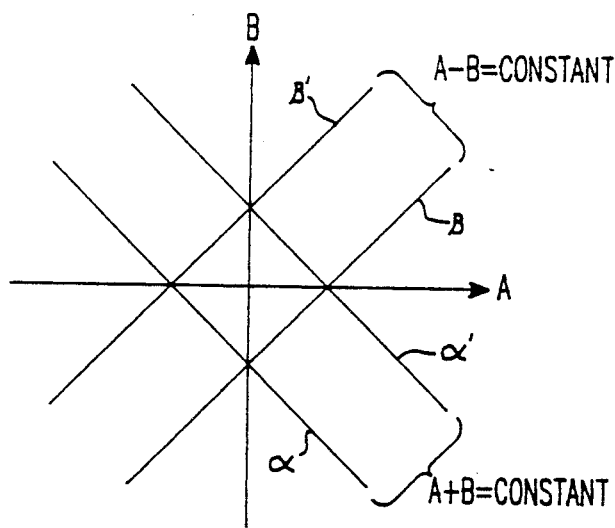
FIG. 5 shows the linear separating lines in the weight space of a dyadic element.

These two sets of parallel lines intersect each other to divide the plane up into nine distinct regions as illustrated in FIG. 5.

As in the one input case, the presence of the absolute value of Θ requires that we do the analysis as two cases, Θ positive and Θ negative. We will give a detailed analysis for the case where Θ is positive recognizing that the case for Θ negative is a mirror image. The negative result can be obtained by simply reversing the signs of all of the values, which causes AND and OR to interchange. When Θ is positive, the threshold logic element behaves like an AND-type logic function, that is, it tends to go off if any input is FALSE; when Θ is negative, the threshold logic element behaves like an OR-type logic function, that is, it tends to come on if any input is TRUE. This mirror-like behavior is reflected in the electronic hardware which is indifferent to whether a circuit is interpreted as a NAND or a NOR, and AND or an OR.

Figure 6:
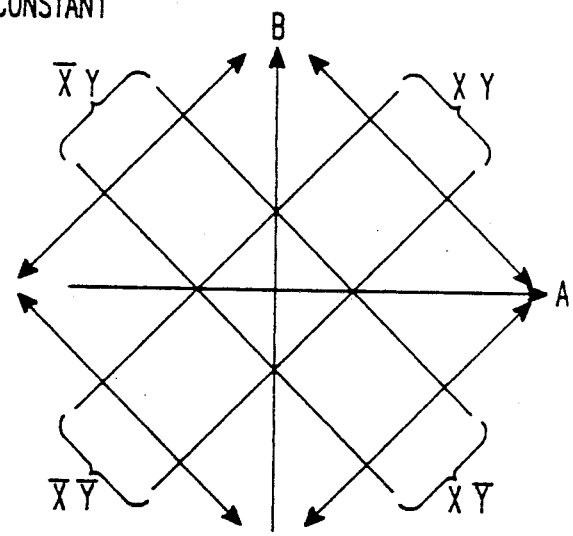
FIG. 6 depicts the rule mapping for the dyadic element.

For the following analysis of the dyadic threshold logic element, is illustrated in FIG. 6, we assume that Θ is positive. When the input x is TRUE and the input y is TRUE, S exceeds Θ and there is an output (TRUE) whenever the values of A and B lie in the three regions to the upper right. Similarly, when the input x is TRUE and the input y is FALSE, there is an output whenever the values of A and B lie in the three regions to the lower right. Proceeding clockwise, when x is FALSE and y is FALSE, there is an output whenever the values of A and B lie in the three regions to the lower left, and when x is FALSE and y is TRUE, there is an output whenever the values of A and B lie in the three regions to the upper left.

In the four regions directly along the cartesian axes, horizontal and vertical, there is an output for each of two separate causes, the regions which contain parts of two of the arrows 20. For example, in FIG. 7, in the region at three o'clock there is an output for both the case of x and y being TRUE, and also for the case of x and NOT y being TRUE, that is, the output in the three o'clock region is x. Similarly, at six o'clock the output is NOT y, at nine o'clock it is NOT x, and at twelve o'clock it is y. There is no output (the boolean logic function is FALSE) for values of A and B which fall in the central region.

For the case in which Θ is negative, the analysis of the dyadic threshold logic element is very similar. S exceeds Θ and there is an output (TRUE): for x TRUE and y TRUE whenever the values of A and B lie in the six regions to the upper right; for x TRUE and y FALSE whenever the values of A and B lie in the six regions to the lower right; for x FALSE and y FALSE whenever the values of A nd B lie in the six regions to the lower left; for x FALSE and y TRUE whenever the values of A and B lie in the six regions to the upper left. Notice that, for the AND-type element (Θ positive) only three regions were covered, but for the OR-type element (Θ negative) six regions are covered. It is this difference in coverage that justifies the labeling the element as being an AND type or an OR type.

Figure 8:
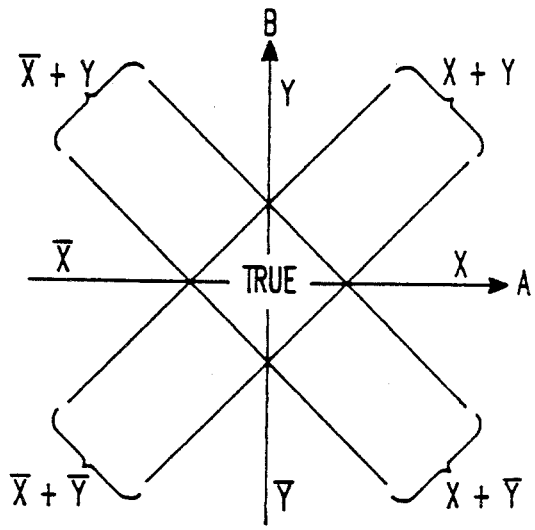
FIG. 8 illustrates the mapping between weight and rule space for a negative threshold $\Theta$.

As before, in the four regions directly along the cartesian axes, there is an output for each of two separate causes, as illustrated in FIG. 8. In addition, for the regions along the diagonals, there is an output for each of three separate causes, a result of the increased coverage. For example, in the region at one-thirty o'clock there is an output for: the case of x and y being TRUE, the case of x and NOT y being TRUE, and the case of NOT x and y being TRUE, that is, the output in this region is x OR y. This is the mirror image of the region at seven-thirty o'clock when Θ is positive since NOT (NOT x AND NOT y)=x OR y. In the central region, there is an output for everyone of the four separate causes so that, for values of A and B which fall in this region, the output is TRUE.

Figure 7:
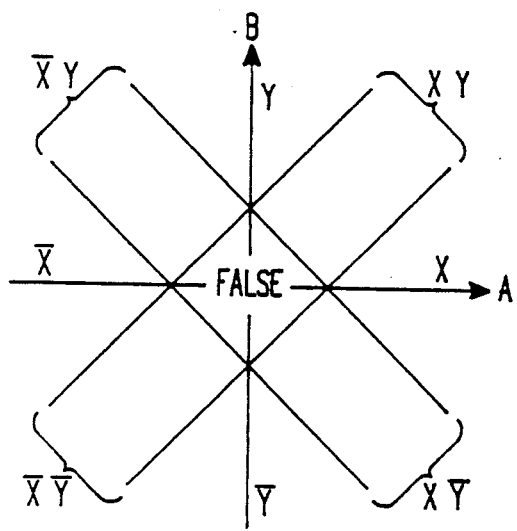
FIG. 7 illustrates mapping between weight and rule space for the dyadic element for a positive threshold $\Theta$.

These two maps in FIGS. 7 and 8 show nine distinct regions for the case in which Θ is positive and nine distinct regions for the case in which Θ is negative. However, the four regions which lie along the cartesian axes are the same in both cases, so that there are only 14 (=2*9−4) distinct Boolean logic functions, generated by a two-input threshold logic element. An examination of these maps uncovers the fact that the two functions XOR and EQV (XNOR) are not present, that is, the summing dyadic threshold logic element can generate all 14 linearly separable functions but is incapable of generating the 2 functions which are non-linearly separable. As discussed in the related applications when the product of linear transformations is used as the logic element, the non-linearly separable functions can also be generated.

Whenever a processing element is capable of performing a disjunction (OR), the possibility of rule redundancy within the network is increased. This inherent redundancy is one of the features that makes neural networks fault tolerant. It is also a reason that neural networks are capable of compact representations of knowledge. Unfortunately, this compact representation brings with it the holistic characteristic associated with traditional neural networks. Redundancy and compactness are unnecessary features for finding an optimal solution. Therefore, for networks with sufficient processing elements, one might consider limiting the search of the neural network weight space to regions that cover only implication rules and conjunctive rules. This approach will yield a network which is non-holistic and can be explained in terms of ordinary expert system decision rules. Making this simplification, the optimization process for such a network is faster consistent with the reduction in the amount of potential redundancy. This choice of possible rules (implication and conjunction) to be implemented by the threshold processing elements has been made because these rules are interrelated, which is a necessary condition for the pattern search optimization algorithm, discussed in more detail later herein, to perform more effectively than an exhaustive search.

Any region of the weight space can be reduced to a single representative point within the region. Within a given region of the weight space, there is a single expert system rule which describes the reasoning performed in that region. Every point within that region is therefore equivalent. Hence, without any loss in generality, the entire region can be depicted by a single representative point within that region. This dramatically reduces the search from an n-dimensional continuum to a finite set of discrete points. Searching for an optimal solution over a finite set of points means that the solution can be found faster than searching for an optimal solution over a multi-dimensional continuum of points. This learning approach is appropriate with a pattern search optimization algorithm because it is an optimization approach which can deal with discrete sets of points in an efficient manner. The reduction of a region to a point eliminates fruitless searches within saddle regions. This means that the learning process associated with traditional neural networks can be speeded up by orders of magnitude.

Delineated in Table 2 are the number of conjunctive rules that can be formed by a perceptron (summing type) processing element with between 1 and 10 inputs.

TABLE 2
DISTRIBUTION OF PERCEPTRON CONJUNCTIVE RULES

| Inputs | Rules | Number of Inputs Utilized | | | | | | | | | | |
|---|---|---|---|---|---|---|---|---|---|---|---|---|
| | | 1 | 2 | 3 | 4 | 5 | 6 | 7 | 8 | 9 | 10 | x |
| 1 | 2 | 2 | — | — | — | — | — | — | — | — | — | — |
| 2 | 8 | 4 | 4 | — | — | — | — | — | — | — | — | — |
| 3 | 26 | 6 | 12 | 8 | — | — | — | — | — | — | — | — |
| 4 | 80 | 8 | 24 | 32 | 16 | — | — | — | — | — | — | — |
| 5 | 242 | 10 | 40 | 80 | 80 | 32 | — | — | — | — | — | — |
| 6 | 728 | 12 | 60 | 160 | 240 | 192 | 64 | — | — | — | — | — |
| 7 | 2186 | 14 | 84 | 280 | 560 | 672 | 448 | 128 | — | — | — | — |
| 8 | 6560 | 16 | 112 | 448 | 1120 | 1792 | 1792 | 1024 | 256 | — | — | — |
| 9 | 19682 | 18 | 144 | 672 | 2016 | 4032 | 5376 | 4608 | 2304 | 512 | — | — |
| 10 | 59048 | 20 | 180 | 960 | 3360 | 8064 | 13440 | 15360 | 11520 | 5120 | 1024 | — |
| n | $3^n-1$ | $2n$ | $2^n{}_n2$ | $2^n{}_n3$ | $2^n{}_n4$ | $2^n{}_n5$ | $2^n{}_n6$ | $2^n{}_n7$ | $2^n{}_n8$ | $2^n{}_n9$ | $2^n{}_n10$ | $2^n{}_nx$ |

The total number of rules for an n input processing element is equal to $3^n - 1$.

The complexity of the perceptron processing element is illustrated in Table 3 where for example a 19 input element will generate 1.62E09 different rules.

TABLE 3
NUMBER OF NON-REDUNDANT PERCEPTRON CONJUNCTIVE RULES

| n | $3^n-1$ | n | $3^n-1$ | n | $3^n-1$ |
|---|---|---|---|---|---|
| 1 | 2 | 11 | 177,146 | 21 | 1.046E10 |
| 2 | 8 | 12 | 531,440 | 22 | 3.138E10 |
| 3 | 26 | 13 | 1,594,322 | 23 | 9.414E10 |
| 4 | 80 | 14 | 4,782,968 | 24 | 2.824E11 |
| 5 | 242 | 15 | 14,348,906 | 25 | 8.473E11 |
| 6 | 728 | 16 | 43,046,720 | 26 | 2.542E12 |
| 7 | 2,186 | 17 | 1.291E08 | 27 | 7.626E12 |
| 8 | 6,561 | 18 | 3.874E08 | 28 | 2.288E13 |
| 9 | 19,682 | 19 | 1.162E09 | 29 | 6.863E13 |
| 10 | 59,048 | 20 | 3.487E09 | 30 | 2.059E14 |

Reduction of the weight space to a finite set of points is of practical import for processing elements less than 30 inputs, because optimal solutions can be found by exhaustive search within reasonable computing times. However, for processing elements with greater than 30 inputs, the solution is at best approximate because of limitations in computation time. As processing speed increases, solving elements with greater numbers of inputs will become practical. The reduction in weight space to a finite set of points is still of practical import for processing elements with greater than 30 inputs because each check for optimality is made only once for any rule. This insures that a better approximation to the optimal solution will be found in a specified time period.

Figure 9:
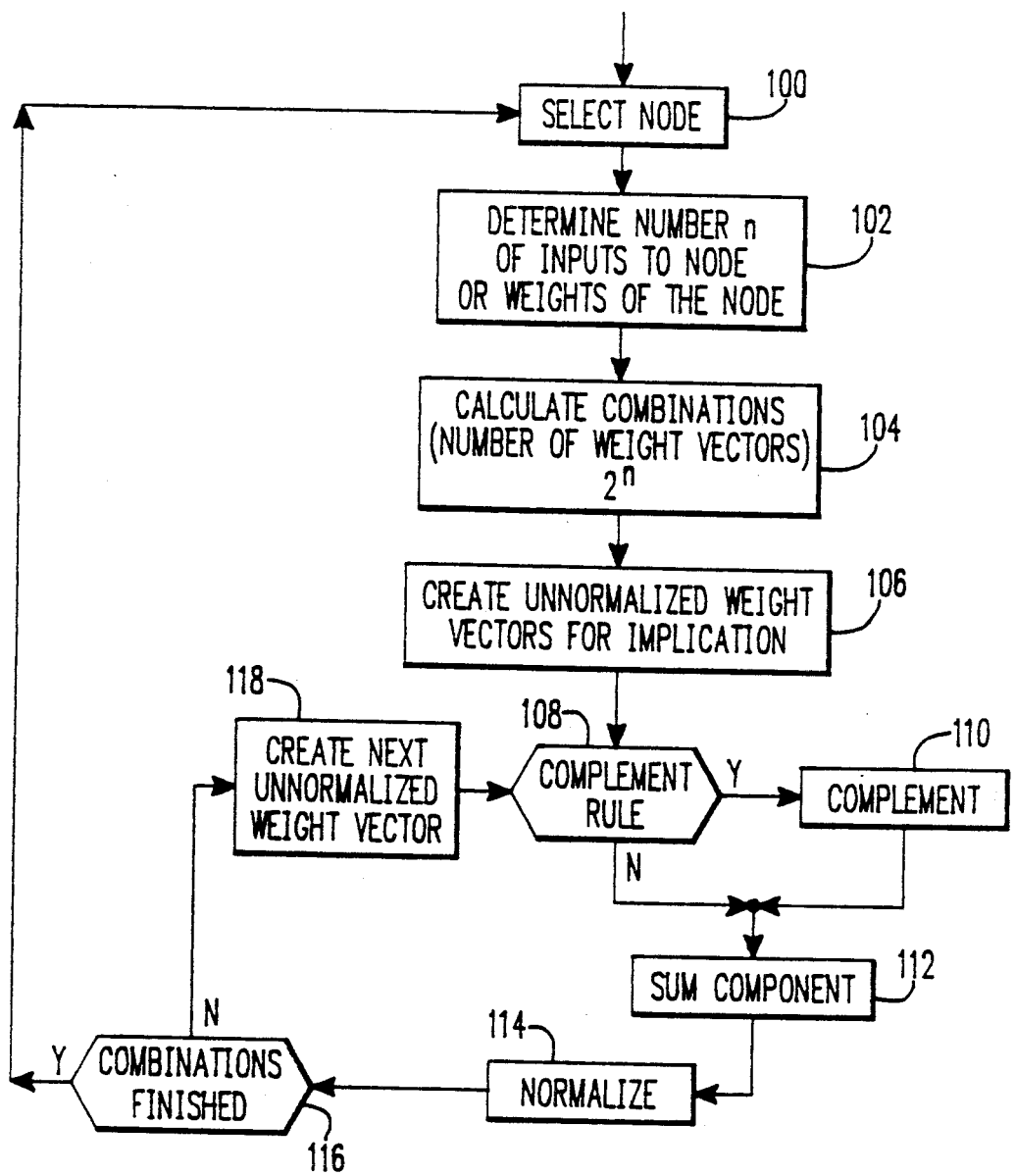
FIG. 9 illustrates how to determine discrete points in the weight space that correspond to the rules for that space.

To reduce the weight space to a finite set of points, that is to pick a point within each weight space region, a process is illustrated in FIG. 9 can be performed. First, a node in the network is selected 100 and examined to determine 102 the number of inputs to the node. Next, the number of combinations of input values possible for that node is calculated 104. Then an unnormalized weight vector is formed 106 for a single implication according to the following:

$$\hat{V}_i = c_{i1}, \ldots, c_{ij}, \ldots, c_{in} \qquad (6)$$

$$\text{where } c_{ij} = \begin{cases} 0 \text{ for } i \neq j \\ 1 \text{ for } i = j \end{cases}$$

where n is the total number of weights (inputs). Next, if this unnormalized weight vector component is to be for a complemented rule 110, then the vector must be negated 110:

$$\hat{V}_i = -\hat{V}_i \qquad (7)$$

An unnormalized weight vector for a conjunctive rule is formed 112 in which the individual unnormalized weight vector for the component implications are summed:

$$s_m = v_1 \ldots v_m = \sum_{k=1}^{m} v_k \qquad (8)$$

where m is the number of component implications in the conjunctive rule. The unnormalized weight vector for the conjunctive rule must be appropriately normalized 114 according to the following algorithm:

$$\hat{w}_m = \begin{cases} 2\hat{s}_m \ominus & \text{for } m = 1 \\ \hat{S}_m \ominus & \text{for } m = 2 \\ \dfrac{1}{m-1} \hat{S}_m \ominus & \text{for } m > 2 \end{cases} \qquad (9)$$

In a node with four inputs, when the weight vector for the rule or implication A$\bar{B}$D is to be created, the unnormalized vectors are first create $$V_1 = (1, 0, 0, 0) \tag{10}$$

$$V_2 = (0, 1, 0, 0) \tag{11}$$

$$V_3 = (0, 0, 0, 1) \tag{12}$$

Since this implication has a complement, the corresponding vector is negated.

$$V_2 = (0, -1, 0, 0) \tag{13}$$

The sum is then calculated $$S_m = (1, -1, 0, 1) \tag{14}$$

where m=3. The unnormalized weight vector is then normalized.

$$W_3 = \frac{1 * 1}{3 - 1} (1, -1, 0, 1) = (\tfrac{1}{2}, -\tfrac{1}{2}, 0, \tfrac{1}{2}) \tag{15}$$

Next, a determination 116 is made as to whether all the weight vectors have been created, if not, the next unnormalized weight vector for the next implication is created in accordance with equation 6 and the process is continued. If all combinations have been finished, the next node is selected 100. This procedure will create a complete set of weight vectors for the conjunctive rules of each node in a neural network. When this process is performed for a neural network node (particularly a perceptron processing element with 1 to 4 inputs) a set of weight vectors as illustrated in Table 4 is produced.

TABLE 4
ESTABLISHED WEIGHT POINTS FOR PERCEPTRON RULES (=1)

One Input

$A = (2)$     $\bar{A} = (-2)$

Two Input

$A = (2, 0)$     $\bar{A} = (-2, 0)$     $B = (0, 2)$     $\bar{B} = (0, -2)$
$AB = (1, 1)$     $A\bar{B} = (1, -1)$     $\bar{A}B = (-1, 1)$     $\bar{A}\bar{B} = (-1, -1)$

Three Input

$A = (2, 0, 0)$     $\bar{A} = (-2, 0, 0)$     $B = (0, 2, 0)$     $\bar{B} = (0, -2, 0)$
$C = (0, 0, 2)$     $\bar{C} = (0, 0, -2)$
$AB = (1, 1, 0)$     $A\bar{B} = (1, -1, 0)$     $\bar{A}B = (-1, 1, 0)$     $\bar{A}\bar{B} = (-1, -1, 0)$
$BC = (0, 1, 1)$     $B\bar{C} = (0, 1, -1)$     $\bar{B}C = (0, -1, 1)$     $\bar{B}\bar{C} = (0, -1, -1)$
$AC = (1, 0, 1)$     $A\bar{C} = (1, 0, -1)$     $\bar{A}C = (-1, 0, 1)$     $\bar{A}\bar{C} = (-1, 0, -1)$ $ABC = \left(\frac{1}{2}, \frac{1}{2}, \frac{1}{2}\right)$     $AB\bar{C} = \left(\frac{1}{2}, \frac{1}{2}, \frac{-1}{2}\right)$     $A\bar{B}C = \left(\frac{1}{2}, \frac{-1}{2}, \frac{1}{2}\right)$     $A\bar{B}\bar{C} = \left(\frac{1}{2}, \frac{-1}{2}, \frac{-1}{2}\right)$ $\bar{A}BC = \left(\frac{-1}{2}, \frac{1}{2}, \frac{1}{2}\right)$     $\bar{A}B\bar{C} = \left(\frac{-1}{2}, \frac{1}{2}, \frac{-1}{2}\right)$     $\bar{A}\bar{B}C = \left(\frac{-1}{2}, \frac{-1}{2}, \frac{1}{2}\right)$     $\bar{A}\bar{B}\bar{C} = \left(\frac{-1}{2}, \frac{-1}{2}, \frac{-1}{2}\right)$

Four Input

$A = (2, 0, 0, 0)$     $\bar{A} = (-2, 0, 0, 0)$     $B = (0, 2, 0, 0)$     $\bar{B} = (0, -2, 0, 0)$
$C = (0, 0, 2, 0)$     $\bar{C} = (0, 0, -2, 0)$     $D = (0, 0, 0, 2)$     $\bar{D} = (0, 0, 0, -2)$
$AB = (1, 1, 0, 0)$     $A\bar{B} = (1, -1, 0, 0)$     $\bar{A}B = (-1, 1, 0, 0)$     $\bar{A}\bar{B} = (-1, -1, 0, 0)$
$AC = (1, 0, 1, 0)$     $A\bar{C} = (1, 0, -1, 0)$     $\bar{A}C = (-1, 0, 1, 0)$     $\bar{A}\bar{C} = (-1, 0, -1, 0)$
$AD = (1, 0, 0, 1)$     $A\bar{D} = (1, 0, 0, -1)$     $\bar{A}D = (-1, 0, 0, 1)$     $\bar{A}\bar{D} = (-1, 0, 0, -1)$
$BC = (0, 1, 1, 0)$     $B\bar{C} = (0, 1, -1, 0)$     $\bar{B}C = (0, -1, 1, 0)$     $\bar{B}\bar{C} = (0, -1, -1, 0)$
$BD = (0, 1, 0, 1)$     $B\bar{D} = (0, 1, 0, -1)$     $\bar{B}D = (0, -1, 0, 1)$     $\bar{B}\bar{D} = (0, -1, 0, -1)$
$CD = (0, 0, 1, 1)$     $C\bar{D} = (0, 0, 1, -1)$     $\bar{C}D = (0, 0, -1, 1)$     $\bar{C}\bar{D} = (0, 0, -1, -1)$ $ABC = \left(\frac{1}{2}, \frac{1}{2}, \frac{1}{2}, 0\right)$     $AB\bar{C} = \left(\frac{1}{2}, \frac{1}{2}, \frac{-1}{2}, 0\right)$     $A\bar{B}C = \left(\frac{1}{2}, \frac{-1}{2}, \frac{1}{2}, 0\right)$     $A\bar{B}\bar{C} = \left(\frac{1}{2}, \frac{-1}{2}, \frac{-1}{2}, 0\right)$ $\bar{A}BC = \left(\frac{-1}{2}, \frac{1}{2}, \frac{1}{2}, 0\right)$     $\bar{A}B\bar{C} = \left(\frac{-1}{2}, \frac{1}{2}, \frac{-1}{2}, 0\right)$     $\bar{A}\bar{B}C = \left(\frac{-1}{2}, \frac{-1}{2}, \frac{1}{2}, 0\right)$     $\bar{A}\bar{B}\bar{C} = \left(\frac{-1}{2}, \frac{-1}{2}, \frac{-1}{2}, 0\right)$ $ABD = \left(\frac{1}{2}, \frac{1}{2}, 0, \frac{1}{2}\right)$     $AB\bar{D} = \left(\frac{1}{2}, \frac{1}{2}, 0, \frac{-1}{2}\right)$     $A\bar{B}D = \left(\frac{1}{2}, \frac{-1}{2}, 0, \frac{1}{2}\right)$     $A\bar{B}\bar{D} = \left(\frac{1}{2}, \frac{-1}{2}, 0, \frac{-1}{2}\right)$ $\bar{A}BD = \left(\frac{-1}{2}, \frac{1}{2}, 0, \frac{1}{2}\right)$     $\bar{A}B\bar{D} = \left(\frac{-1}{2}, \frac{1}{2}, 0, \frac{-1}{2}\right)$     $\bar{A}\bar{B}D = \left(\frac{-1}{2}, \frac{-1}{2}, 0, \frac{1}{2}\right)$     $\bar{A}\bar{B}\bar{D} = \left(\frac{-1}{2}, \frac{-1}{2}, 0, \frac{-1}{2}\right)$ TABLE 4-continued

ESTABLISHED WEIGHT POINTS FOR PERCEPTRON RULES (=1)

| | | | |
|---|---|---|---|
| $ACD = \left(\frac{1}{2}, 0, \frac{1}{2}, \frac{1}{2}\right)$ | $ACD = \left(\frac{1}{2}, 0, \frac{1}{2}, \frac{-1}{2}\right)$ | $A\bar{C}D = \left(\frac{1}{2}, 0, \frac{-1}{2}, \frac{1}{2}\right)$ | $A\bar{C}\bar{D} = \left(\frac{1}{2}, 0, \frac{-1}{2}, \frac{-1}{2}\right)$ |
| $\bar{A}CD = \left(\frac{-1}{2}, 0, \frac{1}{2}, \frac{1}{2}\right)$ | $\bar{A}CD = \left(\frac{-1}{2}, 0, \frac{1}{2}, \frac{-1}{2}\right)$ | $\bar{A}\bar{C}D = \left(\frac{-1}{2}, 0, \frac{-1}{2}, \frac{1}{2}\right)$ | $\bar{A}\bar{C}\bar{D} = \left(\frac{-1}{2}, 0, \frac{-1}{2}, \frac{-1}{2}\right)$ |
| $BCD = \left(0, \frac{1}{2}, \frac{1}{2}, \frac{-1}{2}\right)$ | $BCD = \left(0, \frac{1}{2}, \frac{1}{2}, \frac{-1}{2}\right)$ | $B\bar{C}D = \left(0, \frac{1}{2}, \frac{-1}{2}, \frac{1}{2}\right)$ | $B\bar{C}\bar{D} = \left(0, \frac{1}{2}, \frac{-1}{2}, \frac{-1}{2}\right)$ |
| $\bar{B}CD = \left(0, \frac{-1}{2}, \frac{1}{2}, \frac{1}{2}\right)$ | $\bar{B}CD = \left(0, \frac{-1}{2}, \frac{1}{2}, \frac{-1}{2}\right)$ | $\bar{B}\bar{C}D = \left(0, \frac{-1}{2}, \frac{-1}{2}, \frac{1}{2}\right)$ | $\bar{B}\bar{C}\bar{D} = \left(0, \frac{-1}{2}, \frac{-1}{2}, \frac{-1}{2}\right)$ |
| $ABCD = \left(\frac{1}{3}, \frac{1}{3}, \frac{1}{3}, \frac{1}{3}\right)$ | $ABCD = \left(\frac{1}{3}, \frac{1}{3}, \frac{1}{3}, \frac{-1}{3}\right)$ | $AB\bar{C}D = \left(\frac{1}{3}, \frac{1}{3}, \frac{-1}{3}, \frac{1}{3}\right)$ | $AB\bar{C}\bar{D} = \left(\frac{1}{3}, \frac{1}{3}, \frac{-1}{3}, \frac{-1}{3}\right)$ |
| $\bar{A}BCD = \left(\frac{-1}{3}, \frac{1}{3}, \frac{1}{3}, \frac{1}{3}\right)$ | $\bar{A}BCD = \left(\frac{-1}{3}, \frac{1}{3}, \frac{1}{3}, \frac{-1}{3}\right)$ | $\bar{A}B\bar{C}D = \left(\frac{-1}{3}, \frac{1}{3}, \frac{-1}{3}, \frac{1}{3}\right)$ | $\bar{A}B\bar{C}\bar{D} = \left(\frac{-1}{3}, \frac{1}{3}, \frac{-1}{3}, \frac{-1}{3}\right)$ |
| $A\bar{B}CD = \left(\frac{1}{3}, \frac{-1}{3}, \frac{1}{3}, \frac{1}{3}\right)$ | $A\bar{B}CD = \left(\frac{1}{3}, \frac{-1}{3}, \frac{1}{3}, \frac{-1}{3}\right)$ | $A\bar{B}\bar{C}D = \left(\frac{1}{3}, \frac{-1}{3}, \frac{-1}{3}, \frac{1}{3}\right)$ | $A\bar{B}\bar{C}\bar{D} = \left(\frac{1}{3}, \frac{-1}{3}, \frac{-1}{3}, \frac{-1}{3}\right)$ |
| $\bar{A}\bar{B}CD = \left(\frac{-1}{3}, \frac{-1}{3}, \frac{1}{3}, \frac{1}{3}\right)$ | $\bar{A}\bar{B}CD = \left(\frac{-1}{3}, \frac{-1}{3}, \frac{1}{3}, \frac{-1}{3}\right)$ | $\bar{A}\bar{B}\bar{C}D = \left(\frac{-1}{3}, \frac{-1}{3}, \frac{-1}{3}, \frac{1}{3}\right)$ | $\bar{A}\bar{B}\bar{C}\bar{D} = \left(\frac{-1}{3}, \frac{-1}{3}, \frac{-1}{3}, \frac{-1}{3}\right)$ |

The threshold in this example has been fixed at one value, $\Theta=1$. This has been done because (1) the processing element generates the same rules as any processing element with $\Theta \geq 0$ and (2) this processing element, when feeding a single input perceptron with a threshold $\Theta=1$ and an interconnection weight of $-1$, generates the same rules as a processing element with $\Theta \leq 0$. If a threshold other than 1 is to be used for the neural network nodes, the weights are simply multiplied by the threshold to be used. For example, if the implication discussed above with respect to equations 10-15 has a threshold of 3, the following weights would ultimately result:

$$W_3 = \left( \frac{3}{2}, \frac{-3}{2}, \frac{0}{2}, \frac{3}{2} \right) \quad (16)$$

A learning algorithm provides a neural network with the ability to adapt to changes in the environment. Some of the learning algorithms used in neural networks are: the Grossberg algorithm—for competitive learning of weighted average inputs; the Hebb algorithm—for correlation learning of mutually-coincident inputs; the Kohonen algorithm—for vector formation consistent with probability density function; the Kosko/Klopf algorithm—for sequential representations in temporal order; the Rosenblatt algorithm—for performance grading of a linear discriminant; and the Widrow algorithm—for minimization of a mean square error cost function. The present invention uses a superior learning algorithm: the Hooke/Jeeves Direct Search algorithm (Robert Hooke and Terry A. Jeeves (1961) "'Direct Search' Solution of Numerical and Statistical Problems" Jour. ACM 8, pp.212-229, incorporated by reference herein) for optimization of the cost function. The present invention bases the learning algorithm on a direct search because it is the best simple, fast and reliable way to solve multivariate nonlinear optimization problems.

The concepts underlying direct search are not those of conventional analysis which demands well-behaved analytic functions, preferably, functions that behave very much like simple quadratics. A direct search has the virtue of being able to work even if the cost function, which measures the degree of success, is discontinuous; and even if the parameters of the function take on only a finite set of discrete values.

The direct search approach to solving numerical and statistical problems had its origin in efforts to deal with problems for which classical methods were unfeasible. It is a strategy for determining a sequence of trial solutions that converge to a problem's solution. A direct search has never been used in connection with neural network learning since it best operates on discrete values and neural networks, to date, have learned by searching a continuous weight space. A direct search has significant practical advantages: it solves intractable problems; it provides faster solution; it is well adapted to implementation in digital electronic hardware; it provides a constantly improving approximate solution; and it permits different and less restrictive assumptions about the mathematical model of the problem.

The direct search method has been used successfully to solve curve fitting problems, integral equations, restricted and unrestricted optimization of functions, as well as systems of equations. The present invention uses it to teach neural networks.

Figure 10:
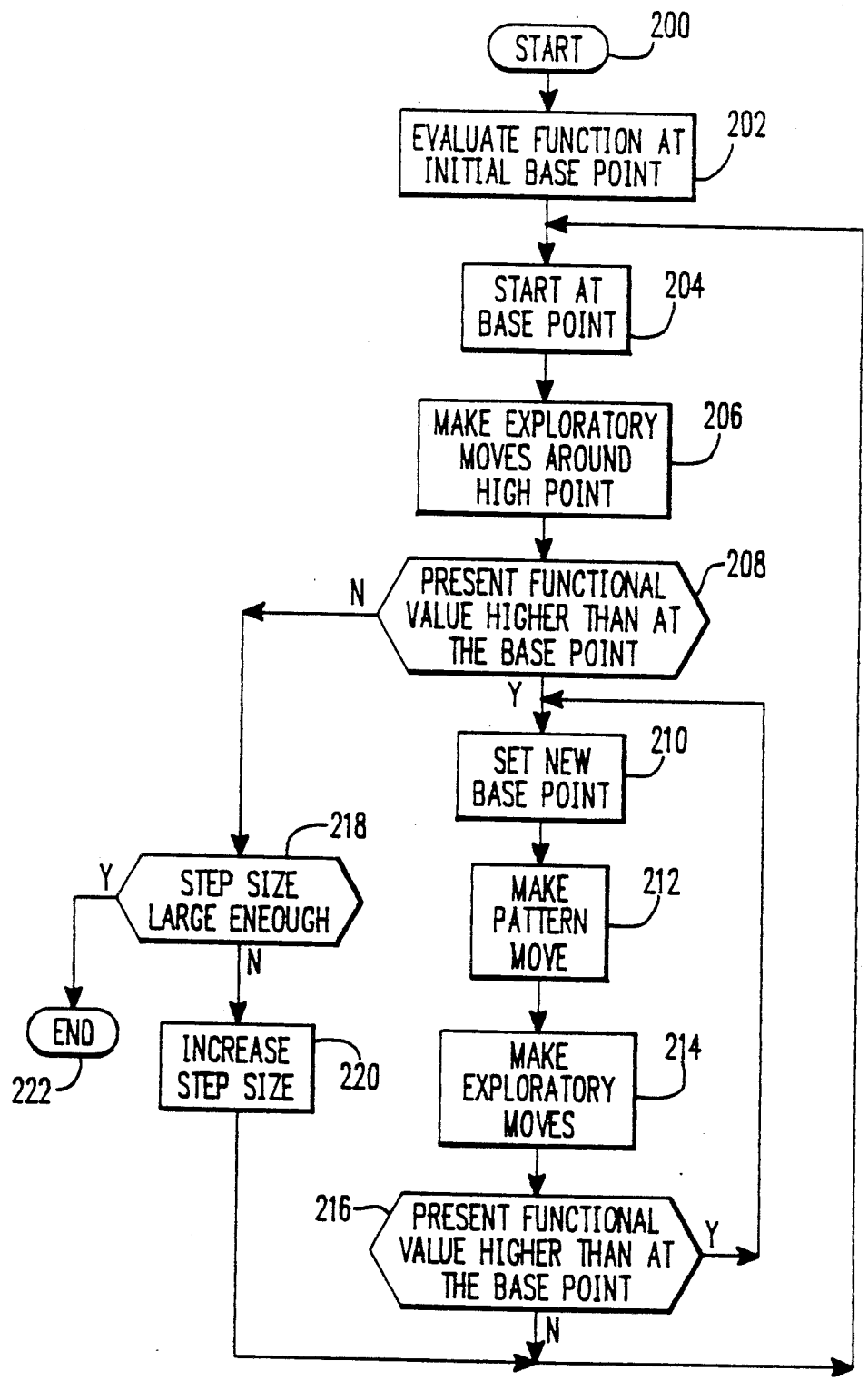
FIG. 10 depicts a pattern search.

A particularly successful direct search routine is pattern search. A flowchart for it is shown in FIG. 10. Pattern search uses two kinds of moves in going from one trial point to another. The first type is a smallish exploratory move designed to acquire knowledge. The second type is a largish vector move, the pattern move, which is designed to make progress. The direction chosen for the pattern move is the result of consolidating all of the acquired knowledge from previous exploratory and pattern moves. The full strategy and precise tactics for a pattern search are described fully in the paper incorporated by reference herein.

When a direct search, in accordance with the flowchart of FIG. 10 is performed, after the process is started 200, for the particular node, an initial base point is chosen at random and the cost function is evaluated. The cost function in evaluating discrete rules as illustrated in Table 3 is the commonality between the rule evaluated and the target rule. As commonality increases the cost function rises. Starting 204 at a base point several exploratory moves 206 are made around the base point. If the present value of the function at the exploratory point is higher than the base point 208, a new base point is set 210. If a cost function is chosen that decreases step 108 would look for a lower value. If not higher, a determination 218 is made as to whether or not the step size is large enough. In a decreasing cost function situation the step size in step 218 would be compared to see if it is small enough. In an evaluation of the discrete rules of Table 4, the step size is the distance between points. For example, from CD to ABC is a step of size 1 in a four input device. While a step from AD to ABC in a four input device is a step of size 4. If all of the points around a base point have been explored, the step size is increased 220. With a decreasing cost function, the step size would be decreased. If a new base point has been set 210, a pattern move 212 is made from the base point which preserves the commonality between the base point rule and the rule to which the pattern move is made. Around the pattern move point exploratory moves 214 are made. Once again, the function value is evaluated 216 for each exploratory move. At some point, the maximum functional value will be reached and the process stops for that particular node. This stop is not illustrated in FIG. 10. Commonality can be determined using the actual neural node in the network by obtaining the value produced by the node before the value is tested against the threshold. As this value changes, the commonality rises and falls.

For example, using a four input element as illustrated in Table 4, to perform a pattern search, we have to search for commonality between the rule that is being looked for and the points tested. If the system is looking for $A\overline{B}D$ for a four input node, then all rules which have no common elements will have a cost function of 0. For example, rules $\overline{AC}D$ and $\overline{ABCD}$ have a cost function value of 0 because they have no common elements. All rules which have one common element will have a cost function value of 1, for example $AC\overline{D}$ and A. All rules which have two common elements, have a cost function value of 2, for example $\overline{ABCD}$ and $A\overline{B}$. In like manner all rules which have three common elements have a cost function value of 3, for example $A\overline{BCD}$. To perform the search, each time the cost function increases or stays the same value, a new base point is established. From this base point a pattern move is made which preserves the commonality between the rule which increased the cost function and the base rule. For example, assume that the system is searching for $A\bar{B}D$ as mentioned above. If the rule BCD is chosen at random as an initial base point having a cost function of 1, and the first exploratory move is to $BC\bar{D}$, because the cost function is 0 for this rule $BC\bar{D}$ does not become a new base point. If on the next exploratory move $\overline{BC}D$ is chosen, because it has a cost function of 2, it will become the new base point. The common element is identified as $\bar{B}$, so only moves which preserves $\bar{B}$ will be tried. As a result, this eliminates $B\bar{C}D$ as an exploratory move. If $A\bar{B}CD$ is attempted as an exploratory move a cost function of 3 is obtained and becomes a new base point. The commonality between the points is $\bar{B}D$ requiring that all exploratory moves preserve this commonality. If an exploratory move from $A\bar{B}CD$ is made to $\overline{A}\bar{B}CD$, the cost function is 2 resulting in $\overline{A}\bar{B}CD$ being rejected as a base point. If an exploratory move is made to $A\bar{B}\bar{C}D$, the cost function is 3 and this point becomes a new base point. The commonality is $A\bar{B}D$. When the pattern move to $A\bar{B}D$ is made, the maximum cost function of 4 is discovered and the rule has been found. In this example, we started with a three weight rule as our base point. In practice it is best to start with a base point that has the most number of existing weights, such as ABCD for a four input device. By starting at such a point convergence to the solution will be faster because the likelihood of increased commonality on the first base point is greater. By creating a discrete weight space and searching this discrete weight space dramatic savings in time of convergence over searching a continuous weight space occurs. For example, if a four input node weight space is being searched, if it is searched sequentially, the maximum number of trials is 79. If a direct pattern search approach is taken for a four input node the number of steps necessary will be further reduced as shown in the example previously discussed.

Figure 11:
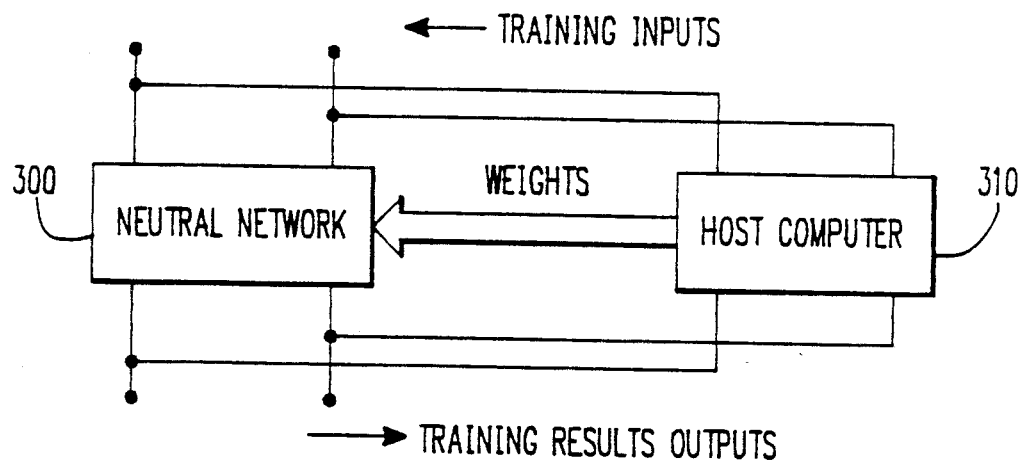
FIG. 11 shows the components of the training and weight space evaluation units for the neural network.

The operations of determining the weights space vectors for the nodes in a neural network 300 as well as the operation of performing a direct search for the actual rules represented by the nodes, is performed by a host computer 310 as illustrated in FIG. 11. A suitable processor could be a 6820 by Motorola. The host computer 310 controls the weights used by the neural network during the training portion as training inputs are applied thereto and trainings results output. The host computer 310 evaluates the cost function (the results) to determine what weights to change using the direct search method previously discussed.

Figure 12:
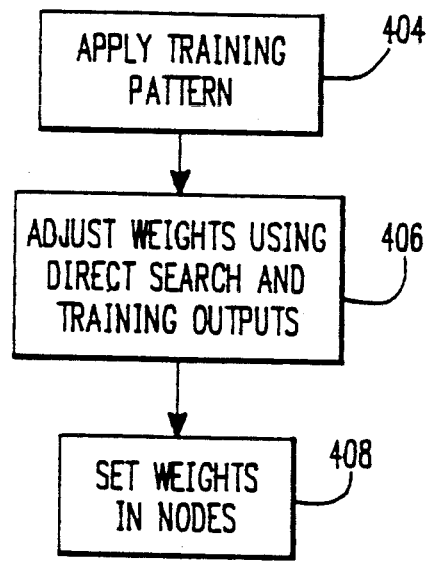
FIG. 12 illustrates the combination of determining the weight space and determining the weights which optimize the network.

FIG. 12 illustrates the overall process of optimizing a neural network. First a discrete weight space for each node is determined by processor 310. For each node an initial set of discrete weights within the weight space by the processor 310 is chosen at random. These weights are loaded into the network 300 and the training pattern is applied 404 by processor 310. The weights are then adjusted 406 by the direct pattern search as the training inputs are applied and the network outputs are examined for changes in the cost function. Once the weights are no longer changing, the weights are set in the network 300 and the host 310 is disconnected, allowing the network to begin operating on real inputs.

This disclosure has examined the classical perceptron processing element which has been used to build many neural networks. The standard perceptron learning algorithm was derived from a steepest descent optimization procedure. Even the latest back propagation learning algorithm is derived from a steepest descent optimization procedure using a sigmoid function to smooth the output so that a derivative can be taken. These learning techniques are never fast, and with the exception of using the sigmoid function are not clever in attempting to solve the problem. The use of a direct search optimization algorithm, such as a pattern search is a means of speeding up the learning process. To achieve significant gains in speed, the weight space continuum over which the search is performed has been transformed into an equivalent set of discrete points. This transformation allows us to take advantage of the pattern search optimization algorithm's ability to search a finite set of discrete points. The result is a minimization of the amount of time required to reach an optimal solution. These advancements in the formulation of a perceptron learning procedure will increase the speed of the learning process by orders of magnitude, depending upon the number of inputs to the perceptron processing element. As previously discussed, this approach also applies to the weights or coefficients in the new types of neural nodes which base decision making on products of linear transformations or power series expansions as discussed in the related applications.

The optimization method described herein not only can be used to improve probabilistic reasoning for traditional AI (expert) systems or neural network systems, but also provides improved mechanisms for spatial combination of information or signals for image recognition, 2D or 3D imaging, radar tracking, magnetic resonance imaging, sonar tracking and seismic mapping.

The many features and advantages of the invention are apparent in the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted, falling within the scope of the invention.

What is claimed is

1. An optimizing adaptive reasoning system, comprising:
    a discrete point digital neural network having digital neural nodes; and
    digital training menas for determinign discrete points in a weight space for each digital neural node, applying a training pattern, searching the discrete points for a rule as the training pattern is applied and setting the rule in the corresponding digital neural node when a match occurs.

2. An optimized neural network, comprising:
    a discrete point digital neural network having digital neural nodes with discrete point rules; and
    digital rule means for obtianing the discrete point rules by a direct search of a discrete point rule space.

* * * * *